(12) United States Patent
Cao et al.

(10) Patent No.: US 9,688,015 B2
(45) Date of Patent: Jun. 27, 2017

(54) DEFORMATION-BASED MICRO SURFACE TEXTURING SYSTEM

(71) Applicant: Northwestern University, Evanston, IL (US)

(72) Inventors: Jian Cao, Wilmette, IL (US); Rui Zhou, Evanston, IL (US); Kornel F. Ehmann, Evanston, IL (US)

(73) Assignee: Northwestern University, Evanston, IL (US)

( * ) Notice: Subject to any disclaimer, the term of this patent is extended or adjusted under 35 U.S.C. 154(b) by 102 days.

(21) Appl. No.: 14/121,920

(22) Filed: Nov. 3, 2014

(65) Prior Publication Data

US 2015/0137403 A1 May 21, 2015

Related U.S. Application Data

(62) Division of application No. 13/374,210, filed on Dec. 15, 2011, now Pat. No. 8,905,748.

(Continued)

(51) Int. Cl.
*B29C 59/04* (2006.01)
*B32B 9/00* (2006.01)
(Continued)

(52) U.S. Cl.
CPC .......... *B29C 59/043* (2013.01); *B29C 59/022* (2013.01); *B29C 59/04* (2013.01);
(Continued)

(58) Field of Classification Search
CPC .......... B29C 2043/463; B29C 44/5627; B29C 2059/023; B29C 59/04
See application file for complete search history.

(56) References Cited

U.S. PATENT DOCUMENTS 3,180,911 A * 4/1965 Muller ................ A24D 3/0204
131/331
5,061,230 A * 10/1991 Buxton ................ B65H 45/24
493/25

(Continued)

FOREIGN PATENT DOCUMENTS

GB 1439266 6/1976
JP 2004-156931 1/2004

OTHER PUBLICATIONS

B.K. Paul, "Micro Energy and Chemical Systems(MECS) and Multi-scale Fabrication", Micromanufacturing and Nanotechnology, N.P. Mahalik, Ed., ed: Springer, 2005, pp. 323-355.

(Continued)

*Primary Examiner* — Stella Yi
(74) *Attorney, Agent, or Firm* — Cook Alex Ltd.

(57) ABSTRACT

A compact deformation-based micro-texturing apparatus and method employ flexure bearing houses for rotatably supporting opposite ends of each of a first (e.g. upper) roll and a second (e.g. lower) roll to provide a working roll gap between the rolls, wherein at least one of the rolls has one or more micro surface features to plastically deform a surface of a workpiece deformed by rolling action in the roll gap. An electrical current may be passed through the workpiece to assist micro deformation. A roll gap adjusting device is operably associated with the first and second flexure bearing houses for adjusting the roll gap dimension to the final depth of the micro surface features to be imparted to the surface of the workpiece by the rolling action. A sheet material or antifriction element (e.g. journal bearing or bushing) is produced having at least one surface that includes rolled-in micro surface depressions wherein depressions have a lateral dimension of about 1 μm to about 10 mm and a depth of about 1 μm to about 10 mm, typically (Continued)

a lateral dimension of about 1 μm to about 100 μm and a depth of about 1 μm to about 100 μm.

3 Claims, 7 Drawing Sheets

Related U.S. Application Data (60) Provisional application No. 61/459,668, filed on Dec. 16, 2010.

(51) Int. Cl.
  *B29C 59/02* (2006.01)
  *B29L 7/00* (2006.01)

(52) U.S. Cl.
  CPC .......... *B32B 9/00* (2013.01); *B29C 2059/023* (2013.01); *B29L 2007/001* (2013.01); *B32B 2307/746* (2013.01); *Y10T 428/24355* (2015.01)

(56) References Cited

U.S. PATENT DOCUMENTS

| | | | |
|---|---|---|---|
| 5,312,569 A | 5/1994 | Mezei | 264/1.24 |
| 5,527,497 A * | 6/1996 | Kanome | B29C 43/222 264/1.33 |
| 5,897,930 A * | 4/1999 | Calhoun | B29C 59/022 428/156 |
| 7,182,837 B2 | 2/2007 | Chen et al. | 162/134 |
| 7,427,371 B2 | 9/2008 | Kawanishi et al. | 264/2.5 |
| 8,408,039 B2 | 4/2013 | Cao et al. | |
| 8,545,142 B2 | 10/2013 | Smith et al. | |
| 8,741,079 B2 | 6/2014 | Roth et al. | |
| 9,144,845 B1 | 9/2015 | Grzina et al. | |
| 9,168,580 B2 | 10/2015 | Cao et al. | |
| 9,221,091 B2 | 12/2015 | Beltran et al. | |
| 9,283,671 B2 | 3/2016 | Cao et al. | |
| 9,321,090 B2 | 4/2016 | Xia et al. | |
| 2003/0235444 A1 | 12/2003 | Dickhoff et al. | 399/313 |
| 2007/0184743 A1* | 8/2007 | Nordlinder | B32B 38/10 442/376 |

OTHER PUBLICATIONS

A.Z. Szeri, "Tribology: Friction, Lubrication, and Wear", Hemishpere Publishing Co., 1980.

I. Etsion, "State of the art in laser surface texturing", Journal of Tribology—Transactions of the Asme, vol. 127, pp. 248-253, Jan. 2005.

T. Nanbu et al., "Micro-Textures in Conentrated Conformal-Contact Lubrication: Effects of Texture Bottom Shape and Surface Relative Motion", Tribology Letters, vol. 29, pp. 241-252, Mar. 2008.

U. Pettersson et al., "Influence of surface texture on boundary lubrication sliding contacts", Tribology International 36, pp. 857-864, Nov. 2003.

T. Davis, "Experimental Friction Study of Micro-Scale Laser-Textured Surfaces", International Workshop on Microfactories, Evanston, IL, 2008.

M. Beltran et al., "Microchannel Fabrication using Micro-Incremental Forming in Thin Stainless Steel Sheet", 3rd International Conference on Micromanufacturing, Pittsburg, PA, 2008.

D.M. Allen, "Photochemical machining: from 'manufacturing's best kept secret' to a $6 billion per annum, rapid manufacturing process", Cirp Annals—Manufacturing Technology, vol. 53, pp. 559-572, 2004.

M. Futamura et al., "Development of micro-dimple forming process," 3rd JSME/ASME, Evanston, IL, United States, 2008.

J. Cao et al., "An investigation on bump formation in forming of micro dimples," Steel Research Inter.,vol. 81, pp. 1160-1165, 2010.

P. Gao et al., "A Six-Degree-Of-Freedom Micro-Manipulator Based on Piezoelectric Translators," Nanotechnology, vol. 10, pp. 447-452, 1999.

B. Yi et al., "Design and Experiment of a 3DOF Parallel Micro-Mechanism Using Flexure Hinges," IEEE Trans. Robotic Autom., vol. 19, pp. 604-612, 2003.

S.L. Canfield et al., "Development of a Spatial Compliant Manipulator," Intern. J. of Robotic Autom., vol. 17,pp. 63-71, 2002.

N. Ren et al., "Micro textures in concentrated-conformal-contact lubrication: Effect of distribution patterns," Tribology Letters, vol. 28, pp. 275-285, Dec. 2007.

* cited by examiner

Nylon

Fig. 8B

LDPE

Fig. 8C

PMMA

DEFORMATION-BASED MICRO SURFACE TEXTURING SYSTEM

This application claims benefits and priority of provisional application Ser. No. 61/459,668 filed Dec. 16, 2010, the entire disclosure of which is incorporated herein by reference.

FIELD OF THE INVENTION

The present invention relates to a deformation-based micro-surface texturing apparatus and method useful for efficiently and economically fabricating surface textures, such as micro channels and micro dimples, on the surface of thin metallic or non-metallic sheet materials.

BACKGROUND OF THE INVENTION

Creating micro-scale surface textures on the exterior of interface parts has potentially promising energy and biomedical applications wherein creation of new energy resource and saving of energy consumption can be enabled through innovative micro-forming technologies. The micro-manufacturing technology which leads to reduction of energy consumption and environmental pollutions will bridge macro-scale production and nano-scale enabling science to make it possible for realizing innovative ideas on energy sustainability. For example, arrayed microchannel device (AMD) is a stack of laminas contacted through channel heads. Each lamina consists of hundreds of microchannels that facilitate heat exchange or mass transfer. AMD has a direct impact on increasing energy efficiency in the application areas, such as distributed power generation, hydrogen generation and fuel cells. Micro-channel heat exchangers have demonstrated heat fluxes 3 to 5 times higher than conventional heat exchangers [reference 1]. As energy efficiency has become increasingly important due to escalating fuel costs, the desire to reduce friction and wear of contacting surfaces has intensified. It is estimated that up to one third of all energy usage worldwide is used to overcome friction, resulting in a potentially significant energy savings with even moderate friction reduction [reference 2]. Surface texturing is a nontraditional technique for friction reduction; rather than maintaining a very smooth surface, dimples are intentionally created on the surface of a part in sliding contact, resulting in a significant friction reduction [references 3-7]. These dimples serve as micro-reservoirs for the lubricant, resulting in a reduction in lubricant leakage. During sliding, lubricant pressure builds up in the dimples, which in turn helps to create a separation between the contact parts. The dimples also function as receptacles for debris and wear particles, eliminating potential scratching of the substrate surface during the relative motion of the interface parts.

Economically sustainable manufacturing methods are needed to enable the commercialization of these applications. Established fabrication methods for micro channels and micro dimples include laser ablation, micro machining, and photochemical machining. Laser ablation utilizes high-intensity laser pulses to incrementally ablate minute segments of the substrate material to create the desired feature geometry [reference 3]. Laser ablation can easily texture nearly any material. However, it requires expensive equipment and surface finish of product is generally poor if a fast process is desired. Micro machining removes material from a substrate using cutting or milling to leave a desired geometry. Micro incremental forming [reference 8], one type of die-less micro forming, forms micro channels of various profiles by depressing and drawing the single point tool along the thin metal sheet. These three methods allow for accurate shapes and tolerances, but are fairly time consuming and expensive. They are only suitable for fabricate prototypes.

Currently, mass production of micro channels and dimples are enabled by photochemical machining, which places an etching mask on the top of specimen to selectively etch the material via etching chemicals [reference 9]. Photochemical machining is able to create almost any geometry that mimics a pre-made pattern. However, the fabrication cost of this process is still too high when high-volume of shims is needed. Besides, photochemical machining also poses material waste and environmental concerns. Most of the chemicals such as cleaning solutions, etchants, strippers etc. are hazardous liquids. Therefore, handling and disposal of them are very costly. The ideal manufacturing must be able to minimize the impact to the environment. Therefore, a method which is capable of efficiently and economically fabricating micro channels and micro dimples is needed.

If the deformation-based micro surface texturing process successfully meets the tolerance requirement, it will lead to many launches of applications in the areas of energy generation, energy utilization and optical illusions. However, during the forming process, the bump or pile-up is built up around the dimples. Futamura et al. [reference 10] developed a micro dimple forming process to improve the anti-seizing properties of sliding surfaces of mechanical components and reduce frictional resistance. They found bumps building up when forming the dimples on A2017 aluminum alloy and S45C carbon steel pipes. After burnishing the bumps, the depth of the dimples on A2017 pile almost kept the same, while the dimples on S45C pipe disappeared totally. The reason for this, difference is that to remove the bump of carbon steel which has a much higher Young's modules and strength than those of the aluminum alloy, burnishing roll has to go deeper, which flattened not only the bumps but also the dimples. Cao et al. [reference 11] investigated the effect of relative velocity on shape distribution of the micro dimples as the relative velocity between the forming tool and sample affects frictional force. They found a clear relationship between relative velocity and frictional force, and its significant effect of relative velocity on the final profile of the dimple.

An economically sustainable micro-manufacturing method embodying deformation-based micro texturing would be beneficial and would enable the commercialization of the above-described applications.

SUMMARY OF THE INVENTION

The present invention provides a deformation-based micro-surface texturing apparatus and method to this end for efficiently and economically fabricating micro surface textures, such as micro channels, micro dimples or other depressions, on the surface of thin metallic or non-metallic sheet material or internal surfaces of a journal bearing, bushing and the like.

In an illustrative embodiment, the present invention provides deformation-based micro-texturing apparatus and method that embody upper and lower rolls, at least one of which has one or more micro surface protrusions to plastically deform the surface of the workpiece (i.e. thin sheet material or journal bearing or bushing), by rolling action in a roll gap between the rolls, thereby creating arrays of micro surface depressions in the surface. The deformation method is controlled to form the micro surface depressions without reducing the original thickness of the workpiece. The micro-deformation apparatus and method can involve passing an electrical current through the workpiece to assist in micro-deformation.

A deformation-based micro-texturing apparatus pursuant to an embodiment of the invention comprises a housing having first and second flexure bearing houses for rotatably supporting opposite ends of each of a first (e.g. upper) roll and a second (e.g. lower) roll to provide a working roll gap between the rolls, wherein at least one of the rolls has one or more micro surface protrusions to plastically deform a surface of a workpiece by rolling action in the roll gap. A roll gap adjusting device is operably associated with the first and second flexure bearing houses of at least one of the rolls for adjusting the roll gap dimension with nanometer resolution to the selected final depth of the micro surface depressions to be imparted to the workpiece surface by the rolling action.

In a particular illustrative embodiment, the deformation-based micro-texturing apparatus comprises a main mono-block (monolithic) housing having integral upper and lower flexure bearing houses to support each end of an upper roll and each end of a lower roll in a manner that enables at least one roll to move up and down. Each roll is rotated about its respective rotational axis by a respective motor, although one roll can act as a free wheel for certain applications. One or both of the upper and lower rolls has a micro surface texture to be imparted to the workpiece surface. When both rolls have micro surface textures, the surface textures can be the same or different. A coarse roll gap adjusting device is operably associated with the lower roll and a fine roll gap adjusting device is operably associated with the upper roll. For purposes of illustration and not limitation, the coarse roll gap adjusting device comprises a wedge adjusting device that moves adjacent flexure bearing houses of the lower roll in the vertical direction to coarsely adjust the working gap between the two rolls, while the fine roll gap adjusting device comprises electric (e.g. piezoelectric) actuators, that, when energized, move the adjacent flexure bearing houses of the upper roll in the vertical direction to provide fine adjustment of the roll gap dimension for initial set-up and also during real-time surface texturing of the workpiece. A closed loop control system includes a control unit for controlling the fine roll gap adjusting device to maintain a constant distance between the upper and lower flexure bearing houses, and thus provides a constant roll gap dimension between the rolls, in response to input signals from noncontact position sensing devices that detect the gaps between the two sets of upper and lower flexure bearing houses and feed corresponding signals to the control unit for a closed-loop control of the fine roll gap adjusting device. A load detecting device is provided for detecting the load applied to the flexure bearing houses by the fine adjusting device.

In practice of an illustrative method embodiment of the invention, a metallic or non-metallic (e.g. polymer) sheet material is surface textured by rolling action between the rolls with the roll gap adjusted to achieve a final depth of the micro surface depression(s) in the material surface with a small reduction in the original thickness of the sheet material. The sheet material can have an original sheet thickness in the range of about 20 µm to about 1.5 mm, although the sheet thickness is dependent on the depth to which the sheet material is to be textured by depressions. The method can be practiced to form one or more micro surface depressions, such as micro channels or micro dimples, having a lateral dimension (e.g. diameter or width) of about 1 µm to about 10 mm and a depth of about 1 µm to about 10 mm. Typically, the micro depressions have a lateral dimension (e.g. diameter or width) of about 1 µm to about 100 µm and a depth of about 1 µm to about 100 µm.

The present invention is advantageous in that the rolling method is deformation-based such that there is a minimum material waste. Moreover, practice of the present invention enables mass production of microchannels or other depressions on the workpiece surface at a low cost and reduces the energy consumption, significantly. The present invention is further advantageous in providing a micro-deforming method that can be practiced at room temperature without the need for heating of the workpiece (e.g. sheet material or journal bearing) and is significantly faster and less expensive than machining or laser texturing. Compared to photochemical machining, micro-form rolling pursuant to the invention is more environmental friendly and more efficient. The micro-form rolling technique could also be implemented in industry to rapidly and inexpensively effect surface texturing of parts for energy generation and energy utilization, greatly improving the viability of widespread use of surface texturing for friction reduction.

Other advantages of the present invention will become more readily apparent from the following drawings taken with the following detailed description of the invention.

BRIEF DESCRIPTION OF THE DRAWINGS

FIG. 3A is view of the fine roll gap adjusting device (shown as piezoelectric actuators) for the upper flexure bearing house of the upper roll, while

DETAILED DESCRIPTION OF THE INVENTION

The present invention provides a compact deformation-based micro-surface texturing apparatus as well as method for efficiently and economically fabricating surface textures, such as micro channels and micro dimples, on the surface of thin metallic or non-metallic sheet material or on internal surfaces of a journal bearing, bushing or other antifriction element for providing the contact pair with a sufficiently low friction. The compact deformation-based micro surface texturing apparatus can be placed on a desktop, work table, or other support surface and takes up little space compared to other equipment for micro texturing of sheet materials. The roll itself can be made with its micro surface texture through micro machining, electro discharge machining (EDM) or laser ablation. The present invention enables mass production of micro surface textures at low cost and can reduce the energy consumption significantly and is advantageous in that the micro-deforming method can be practiced at room temperature without the need for heating of the workpiece (e.g. the sheet material or journal bearing).

An illustrative embodiment of the present invention provides a deformation-based micro-texturing apparatus and method that embody upper and lower rolls, at least one of which has a micro-surface features, to plastically deform the surface of the workpiece by rolling action in a roll gap between the rolls, thereby creating arrays of surface micro-features (depressions) in the surface. The rolls are mounted on flexure bearing houses of a main housing and are actuated in a manner to provide ultra-high precision and closed-loop controllability of the roll gap dimension to correspond to a selected final depth of the micro surface depression(s) to be formed in the surface of the workpiece by the rolling action.

Figure 1A:
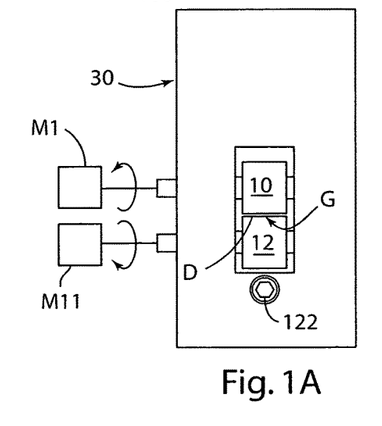
FIGS. 1A and 1B are respective schematic front and side elevation views of a desktop deformation-based microsurface texturing apparatus pursuant to an embodiment of the invention.
Figure 1B:
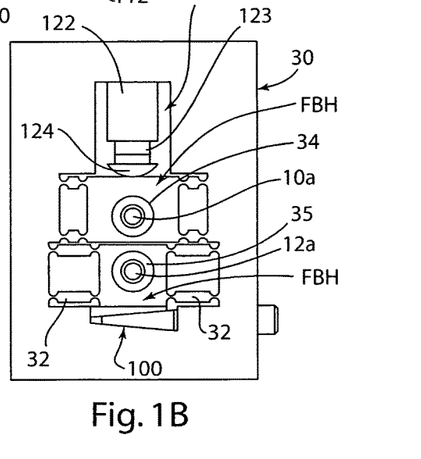
Figure 1C:
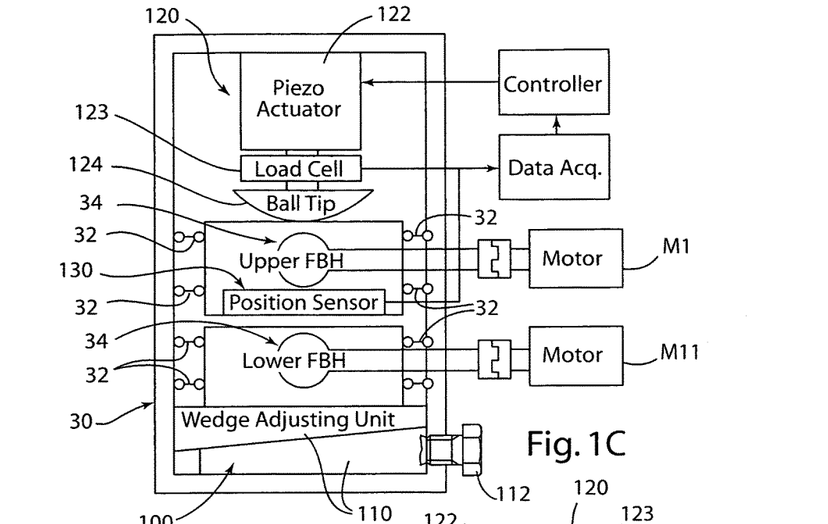
FIG. 1C is more detailed schematic side elevation view of the apparatus.
Figure 5A:
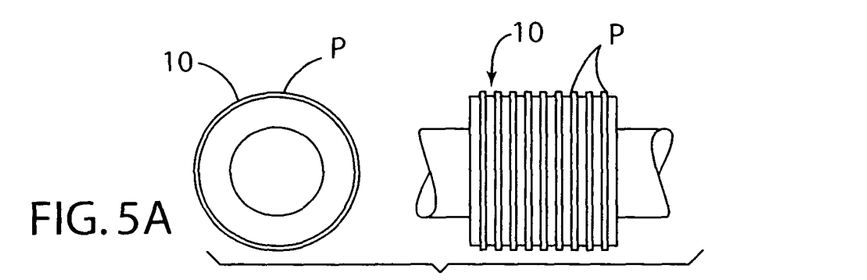
FIG. 5A is a schematic end elevation and side elevation view of the upper roll having a protruding micro-channel-forming texture shown as protruding ribs.
Figure 5B:
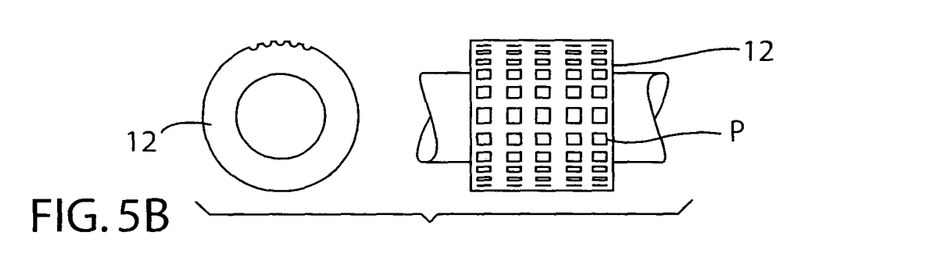
FIG. 5B is a schematic end elevation and side elevation views of the lower roll having a protruding surface texture features shown as rectangular protrusions.
Figure 6A:
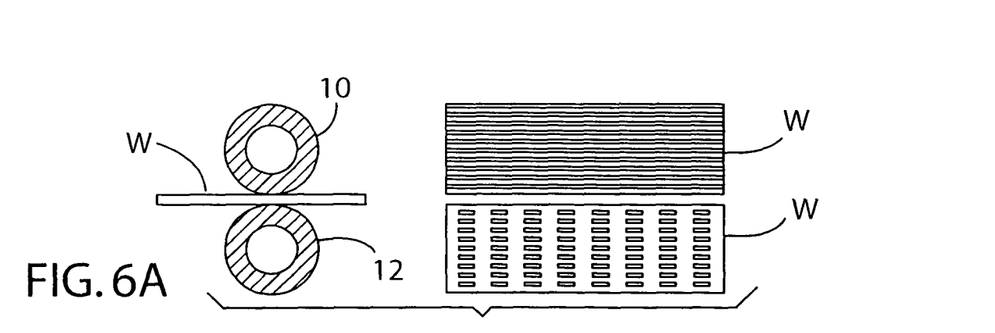
FIG. 6A schematically illustrates a method embodiment of the invention for surface texturing a thin sheet material between the rolls and shows the resulting surface textures on the upper and lower surfaces of the sheet material.
Figure 6B:
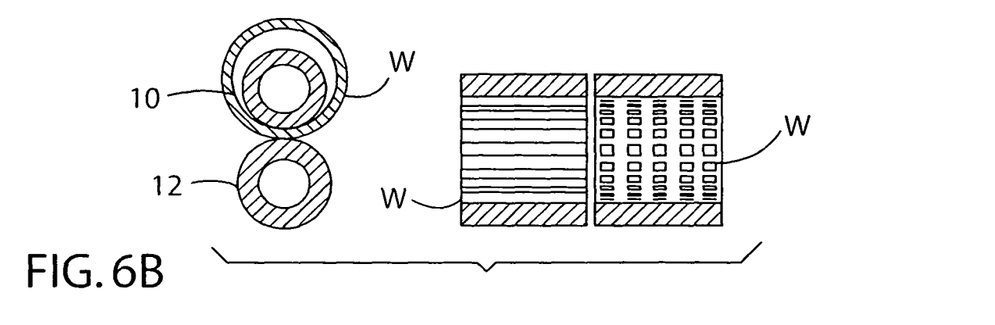
FIG. 6B schematically illustrates a method embodiment of the invention for surface texturing a journal bearing or bushing between the rolls and shows the resulting surface textures on the inner and outer surfaces of the journal bearing or bushing.

Referring to FIGS. 1A, 1B, and 1C, an illustrative apparatus embodiment of the present invention provides deformation-based micro-texturing apparatus having first (upper) and second (lower) rolls 10, 12, at least one of which has a micro-surface protrusions P thereon, FIGS. 5A, 5B, to plastically deform the surface of the workpiece W, FIGS. 6A, 6B, by rolling action in the roll gap G between the rolls 10, 12, thereby creating arrays of surface micro depressions in the surface. The deformation method is controlled to form the micro-surface depressions without reducing the original thickness of the workpiece. Each roll is rotated about its respective rotational axis by a respective motor M1, M11. This system is capable of driving two rolls independently or just drive one and leave the other one as a free wheel.

The deformation-based micro-texturing apparatus comprises a rigid main housing or frame 30 having integral upper and lower flexure bearing houses FBH to support each end 10a of an upper roll 10 and each end 12a of a lower roll 12 in a manner that enables at least one roll to move up and down within a certain range. The main rigid housing or frame with integral FBH's can be cut from one piece of high strength steel block using wire EDM to provide a rigid mono-block (monolithic) frame to ensure ultra-high precision of the apparatus as described below, although the rigid housing or frame can be made by other methods such as by casting, forging, welding and the like.

Figure 4:
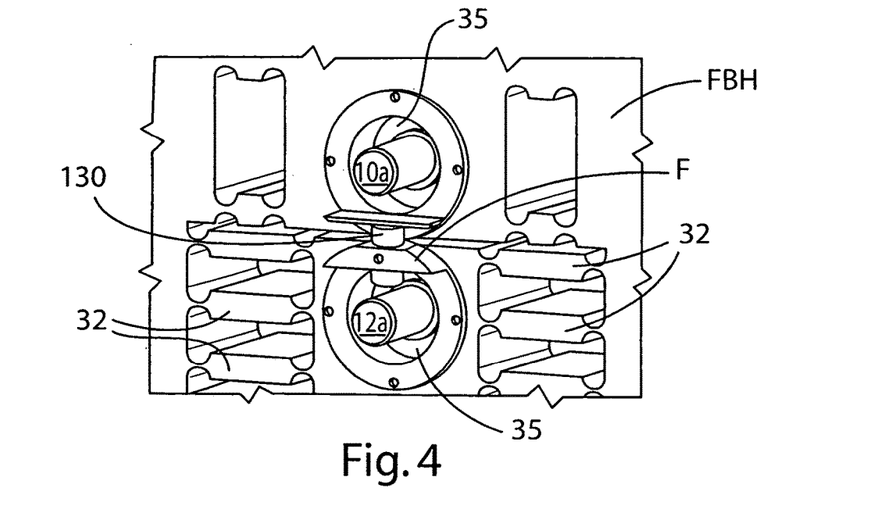
FIG. 4 is a schematic partial perspective view of a noncontact position sensor and its fixture for the flexure bearing houses.

The FBH's serve as support mechanism as well as guiding mechanism for the upper and lower rolls 10, 12. To this end, each FBH has an opening 34 with a conventional antifriction bearing 35 to receive an end 10a or 12a of a respective roll 10 or 12 as shown in FIGS. 1B and 4.

Figure 2:
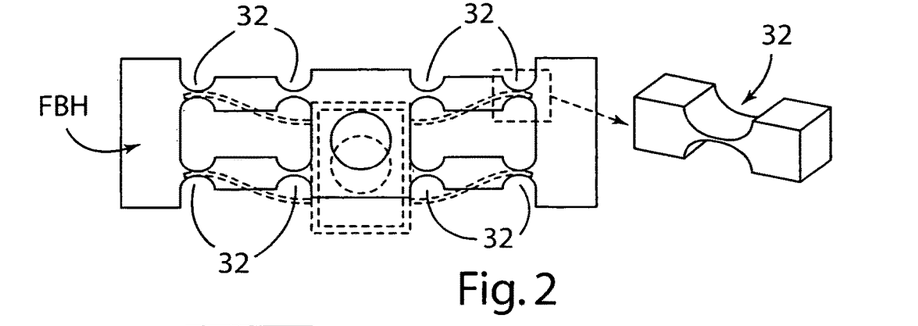
FIG. 2 is a schematic view of an exemplary flexure bearing house for a roll to allow a certain range of vertical motion of the roll as shown.

FIG. 2 schematically illustrates a representative FBH, which is linked to the main rigid housing or frame 30 with flexure hinges 32. The FBH's provide ultra precision vertical linear motion in a small range; for example, a range of 1 μm to 1 mm. Flexure hinges 32, with low rotational stiffness about one axis and high stiffness in other degrees of freedom, enable the FBH's to move vertically while keeping other degrees of freedom constrained. The FBH's possess high natural frequencies, vacuum compatibility and clean room compatibility. Compared with a traditional bearing house which is assembled with linear bushing and sliding rod system, the FBH's have no assembly, therefore, having no error accumulation, no backlash, no friction and no need for lubrication.

Stiffness plays a considerable role in the precise performance of flexure-based ultra-precision FBH's. Usually high stiffness is required to get ultra precise movement. Moving range is another design parameter to consider. The moving range is limited by the yield strength of the FBH material. The flexure hinges 32 will be damaged if the local stress of flexure hinge is higher than the yield strength of the material. Usually, once the material is selected, a compromise exists between the stiffness and moving range. The upper FBH's are pressed by actuators as described below for a real-time roll gap control, so they need high stiffness to ensure the stability and high accuracy. The lower FBH's are supported by the gap adjusting wedge block mechanism described below, so the stiffness can be reduced to get larger moving range. The nature frequencies of both the upper and lower FBHs are designed to be much higher than the frequency of texturing process itself in order to avoid the resonance of the system. Finite element method (FEM) modeling is an effective computational method to investigate the stiffness of a flexure mechanism.

One or both of the upper and lower rolls 10, 12 has a micro surface protruding texture to plastically deform the surface of the workpiece W, creating an array of micro surface depressions with a rolling action. Each roll 10, 12 can be made with the desired surface texture through micro machining, electro discharge machining (EDM) or laser ablation. Roll with surface features may be made of hard metals, tungsten carbide, aluminum, ceramics of nitrogen silicon and the like. FIG. 5A shows roll 10 or 12 which is formed with micro channel-forming protruding features 11. FIG. 5B shows roll 10 or 11 which is formed with protruding corrugation features P, which comprises alternately arranged recesses and projections. Preferably, each micro channel-forming protrusion or recess has a depth of 5 to 100 μm and a width of 2 to 100 μm. In practice of the invention, one roll can have a suitable protruding micro surface texture, while the other roll is polished smooth. Alternately, both rolls 10, 12 can have a micro surface textures, which can be the same or different, such that both sides of a workpiece are textured.

The apparatus includes at least one roll gap adjusting device that is operably associated with the FBH's of at least one of the rolls 10, 12 for adjusting the roll gap vertical dimension D with nanometer resolution corresponding to the selected final depth of the micro surface depressions to be imparted to the surface of the workpiece by the rolling action. For purposes of illustration and not limitation and referring to FIGS. 1C and 3B, a coarse roll gap adjusting device 100 is provided and comprises a wedge adjusting unit having wedges 110a and adjusting screw 112 that moves the flexure bearing houses FBH's of the lower roll 12 in the vertical direction to coarsely adjust the working roll gap dimension between the two rolls, while a fine roll gap adjusting device 120 comprises electric (e.g. piezoelectric) actuators 122, that, when energized, move the flexure bearing houses FBH's of that upper roll 10 in the vertical direction to provide fine adjustment of the roll gap dimension D between the rolls for initial set-up and also during real-time surface texturing of the workpiece.

The roll gap G between upper and lower rolls is first adjusted using the lower coarse roll gap adjusting device 100 by pushing forward or pulling back the bottom wedge 110 using screw 112 of the two wedges shown. Afterward, the upper fine roll gap adjusting device 120 with nanometer accuracy is used for fine adjusting and for real-time adjusting during the surface texturing process to correspond to the selected final depth of the micro surface depressions to be imparted to the surface of the workpiece by the rolling action.

Figure 3A:
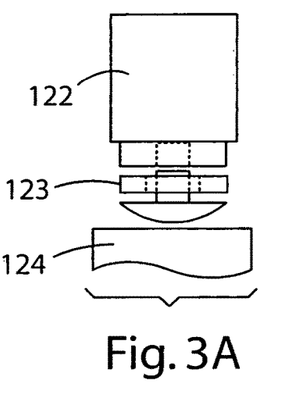
Figure 3B:
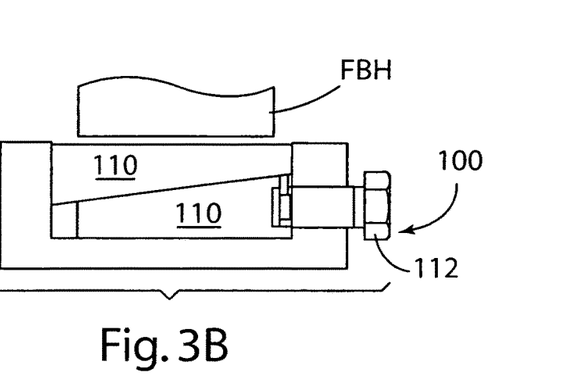
FIG. 3B is a view of the coarse roll gap adjusting device (shown as a wedge adjusting device) for the lower flexure bearing house of the lower roll.

As is seen from FIGS. 1B, 1C and 3A, the fine roll gap adjusting device 120 comprises, for each FBH of the upper roll, a piezoelectric actuator 122 mounted on the frame 30, a piezoelectric load cell 123, and a ball tip 124. A pair of actuator/load cell/ball tip stacks thus are employed to press the two upper flexible bearing houses FBH's of the upper roll independently for ultra precise close-loop control of the gap between the upper and lower rolls and to prevent the tilting of the roll. Each piezoelectric load cell 123 is installed between the piezoelectric actuator 122 and the ball tip 124 to monitor the real-time rolling force. Compared to common strain gauge load cells, the load piezoelectric cells 123 have super high stiffness, which is important to the keep the ultra high precision of the whole apparatus. They are pre-loaded to approximately 20% of the measuring range in order to obtain the best possible linearity. The ball tips 124, which are fixed in the punch head of the piezoelectric actuators 122, are used to prevent the tilting and shearing force which can damage the piezoelectric actuator.

The roll gap G between two rolls 10, 12 cannot be measured directly. Instead, two noncontact capacitive position sensors 130 (one shown) are used to measure the gaps between upper and lower flexure bearing houses FBH's at both ends of the rolls 10, 12 separately. In this way, the roll gap G between the two rolls 10, 12 can be calculated and any minor tilting of the roll can be detected very easily. FIG. 4 shows each noncontact position sensor 130 affixed to the rigid housing or frame 30 so that each sensor 130 is associated with the gap between upper and lower FBH's of the rolls 10, 12. A sensor fixture F is used to fix the sensor and to adjust the initial gap between the sensor the target. Signals from each position sensor 130 are fed into a control unit C (e.g. microprocessor), so that the stroke of piezoelectric actuators 122 is carried out based on (in response to) the signal to keep the roll gap G between upper and lower rolls a required constant value.

A closed loop control system for the piezoelectric actuators 122 includes the control unit CONTROLLER for controlling the fine roll gap adjusting device 120 to maintain a constant distance between the upper and lower flexure bearing houses FBH's and thus provides a constant roll gap dimension between the rolls 10, 12 in response to input signals from the noncontact position sensing devices 130.

In the following description, with the aid of FIG. 6A, operation of micro surface texturing apparatus will be described. In the first case, sheet material W is properly sandwiched between the upper and lower rolls 10, 12. Before this, by work of the roll gap adjusting device, the gap G between upper and lower rolls 10, 12 is adjusted according to the required final depth of the micro surface features. The piezoelectric actuators 122 are utilized to get nanometer accuracy of the roll gap dimension D. Signals from the position sensors 130 are read by the control unit CONTROLLER to monitor the gap G and maintain the gap at desired constant value. CONTROLLER receives load signals from the load cells 123. With continuous rolling process effected by counter rotation of rolls 10, 12 and passing of the sheet workpiece through the roll gap, the micro surface features of the textured roll are pressed against the surface of the sheet workpiece with a certain pressing force and are transferred to the sheet surface.

In the second case shown in FIG. 6B, a journal bearing or bushing W is textured on the inner surface. The upper roll 10 is inside the bearing, pressing the bearing against the lower roll 12 which is outside the bearing. In this case, the upper roll 10 is textured while the lower roll is not and instead is smooth. The micro surface features of the upper roll 10 are pressed against and are transferred to the inner surface of the bearing or bushing by rolling action of rolls 10, 12.

Example 1

To validate the deformation-based surface texturing method of the invention, experiments were conducted using the apparatus described above with the main rigid housing or frame 30 with integral FBH's cut from one piece of high strength steel block using wire EDM to provide a rigid mono-block (monolithic) frame. The rigid frame 30 had an outer envelope having compact dimensions of 340 mm, 200 mm and 166 mm such that it could be placed on a desktop.

One surface of different AA5052 aluminum sheets (40 mm width and 100 mm length) were textured with micro channels to different depths. The roll gap between two rolls 10, 12 was adjusted to correspond to each required final depth of the micro channels. The rolls 10, 12 were 40 mm in length and 46 mm in diameter and were made of tungsten carbide. Piezoelectric actuators 122 were utilized to press the FBH's of the upper roll 10 to get nanometer accuracy of the roll gap dimension D. Signals from displacement sensors 130 were read by the control unit to monitor the roll gap simultaneously. Then, by the continuous rolling process using counter rotating rolls 10, 12, the upper roll 10 is pressed toward the sheet. With this, the micro channel features of the roll 10 are pressed against the contact surface of the sheet with a certain pressing force and are transferred to the sheet. Two electric motors counter rotate the upper and lower rolls independently, giving them speeds up to 20 rpm. The upper roll had a protruding texture of 100 µm wide and 100 µm deep micro channel-forming ribs; the lower roll was polished without any surface features. Two piezoelectric actuators 122 were capable of providing up to 60 kN force and 150 µm stroke length with 0.8 nm resolution. The stiffness of the piezo actuators is 360 N/µm and the resonant frequency is 4.5 kHZ. The piezoelectric load cell 123 had an ultra high rigidity of 5 kN/µm and was capable of measuring up to 30 kN load. The capacitive position sensors 130, with a measurement range up to 2 mm and a resolution as small as 10 nm, were used for non-contact position measurement.

Figure 7A:
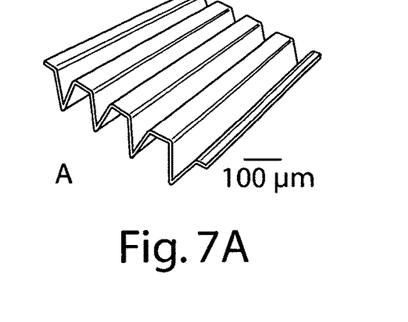
FIGS. 7A and 7B are WLI images of microsurface textures formed on AA5052 aluminum sheet of Example 1.
Figure 7B:
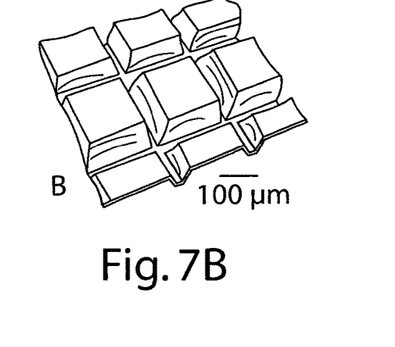
Figure 8A:
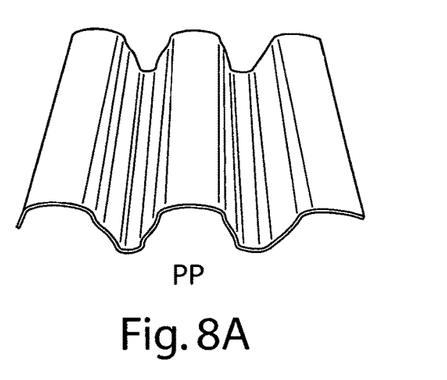
FIGS. 8A, 8B, 8C, and 8D are WLI images of microsurface textures (microchannels) formed on various polymer (PP, Nylon, LDPE, and PMMA) sheets of Example 2.
Figure 8B:
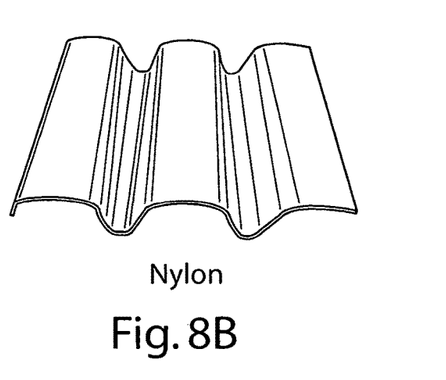
Figure 8C:
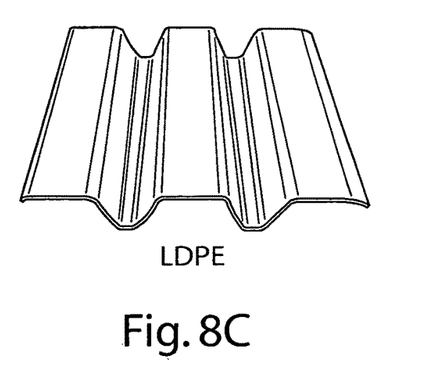
Figure 8D:
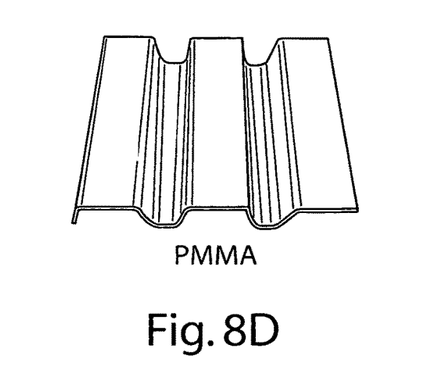

A Zygo white light interferometer (WLI), which can scan a depth of 150 μm with a minimum resolvable depth less than 1 nm, was used to examine the features (depressions) on the formed sheets. FIG. 7A, 7B show the WLI images of the textured surfaces. FIG. 7A shows the micro channels with depth as 25 μm and width as 100 μm; FIG. 7B shows the cross-channel pattern made by texturing the sheet at perpendicular directions (rolling the sheet first in one direction and then in a perpendicular direction).

Example 2

Other experiments were conducted using the apparatus of Example 1 to texture soft polymers including PP, Nylon, LDPE, and PMMA in sheet form having a thickness of 1 mm.

FIGS. 8A, 8B, 8C, and 8D are WLI images of the microsurface textures (microchannels) successfully formed on the various PP, Nylon, LDPE, and PMMA polymer sheets of Example 2. The microchannels had a width dimension of 100 μm and depth dimension of 25 μm.

Electrical-Assisted Micro Surface Texturing

The present invention further envisions another embodiment referred to as electrical-assisted surface texturing (designated EAST) useful, if needed, to texture certain hard metals, such as for example stainless steel and titanium, having high strength and large elastic recovery. EAST involves passing a continuous or pulsed electrical current (DC or AC) through the workpiece during micro deformation. Electrical-assisted forming can significantly improve the formability of the hard metal and reduce springback due to the electroplastic effect. Pulsed current has the advantage of reaching higher current density while keeping the temperature of the workpiece relatively low. However, the formed surface textures will have different depth when the current is on and off. To meet the requirement of uniform texture depth, continuous electrical current is used in EAST with proper insulations and ground connections. Since the materials to be textured are conductive metals, the required voltage is minimal.

Figure 9:
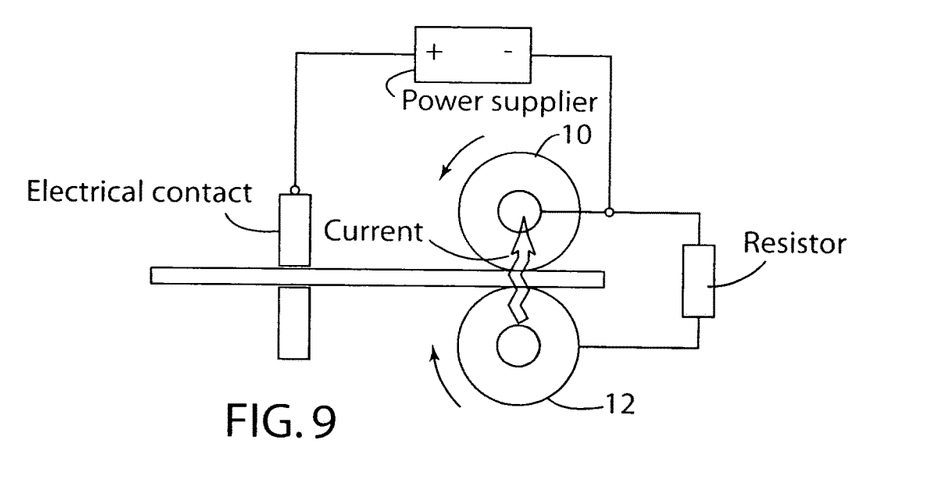
FIG. 9 is a schematic view of a deformation-based microsurface texturing apparatus pursuant to another embodiment of the invention wherein an electrical power supply is connected to the sheet material to achieve electrical-assisted surface texturing pursuant to another method embodiment of the invention.

In practicing the EAST embodiment of the invention, the rolling apparatus described above having monolithic frame 30 with FBH's supporting the upper and lower rolls 10, 12 was modified to provide electrical current that travels from the electrical contact 200, or the anode, to the sheet workpiece W to the textured upper roll 10 (or the cathode) as illustrated in FIG. 9.

The effect of electricity on formability of micro surface texturing process will be described in the Example 3 below. Increasing the formability has several potential benefits, such as allowing more complex and deeper textures to be fabricated, reducing the springback and pile up and reducing the rolling force. In this Example 3, the major electrical current passes through upper roll, as shown in FIG. 9. Based on this setup, experiments were conducted to evaluate the effect of electrical current.

Example 3

Figure 10:
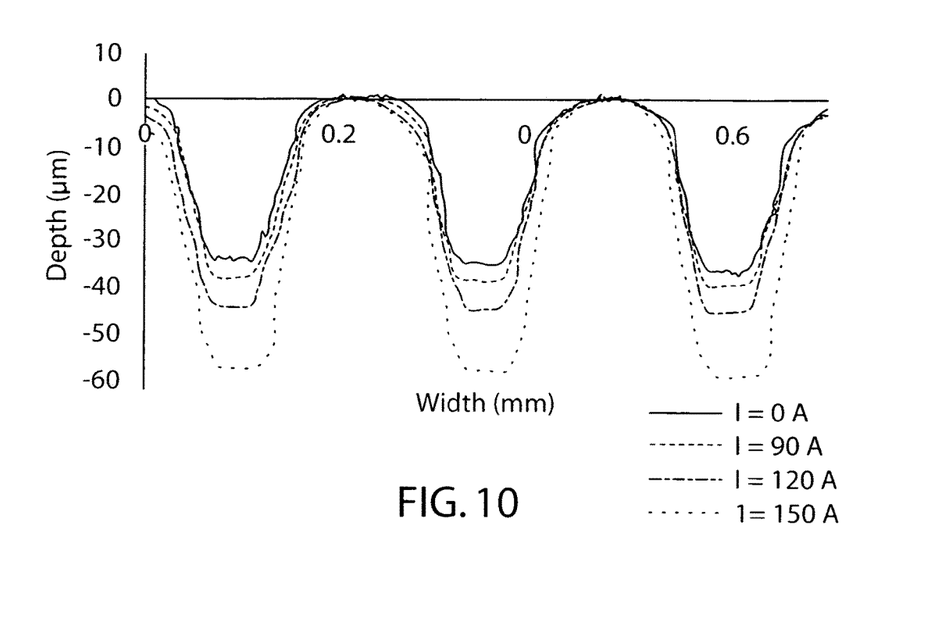
FIG. 10 shows the profile of microchannels formed by the electrical-assisted surface texturing (EAST) method.

Stainless steel strips with a width of 5 mm and thickness of 1.2 mm were used in the experiments to study the ESFT process. The rolling speed was 2 mm/s. Three cases of current densities through the contact area of the teeth of the upper roll and the sheet (strip) were studied, which were 15 A/mm$^2$; 20 A/mm$^2$ and 25 A/mm$^2$. The required currents passed through the sheet were 90 A, 120 A and 150 A, respectively. With electrical current of 0 A, 90 A, 120 A and 150 A, the final depth of the micro channels are 34.5 μm, 38.5 μm, 44.6 μm, and 58 μm, respectively, FIG. 10. With 150 A current pass through, the depth of micro channel increased more than 68%.

Figure 11:
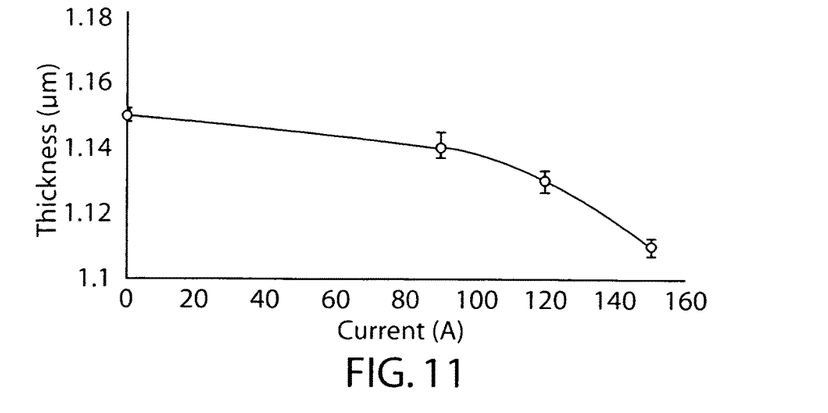
FIG. 11 shows thickness of the sheet after texturing by the EAST method.

Besides of increasing the depth of textured micro channels, the thickness of the sheet also reduced with electrical effect. For each case, five samples were textured, and the final thickness of the sample was measured. Without electrical current, the average final thickness of the sheet is 1.15 mm; while, with electrical current 90 A, 120 A and 150 A, the average final thicknesses of the sheets are 1.14 mm, 1.13 mm and 1.11 mm, respectively, FIG. 11. This result is due to the electrical effect on reduction of yield stress of the stainless steel.

Figure 12:
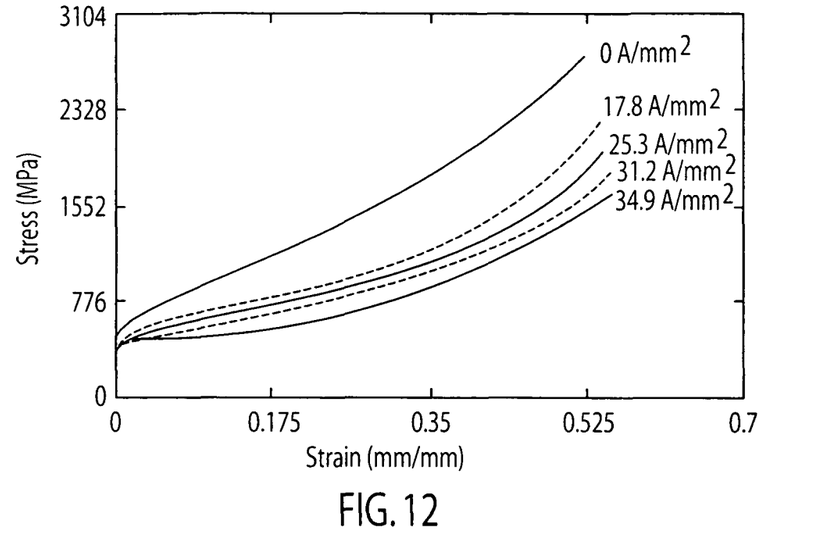
FIG. 12 shows stainless steel stress strain curves.

The experimental results matched the strain-stress curve reported by Perkins et. al, "Metallic forging using electrical flow as an alternative to warm/hot working", Transactions of the ASME, vol. 129, 2007, which is shown in FIG. 12 The effect of the electrical current on stainless steel was significant at relatively low current densities compared to the other materials examined. Even at a density of 17.8 A/mm$^2$, the workability of the specimen significantly increased. From both FIGS. 10 and 12, it is clear to see that when the current density is higher than a certain value, a small change of current density will lead to a more significant change of stress. To be noted, in their electrical-assisted compression test, the highest temperature reached was 182° C. In the next section, the temperature of the sample will be discussed.

Figure 13:
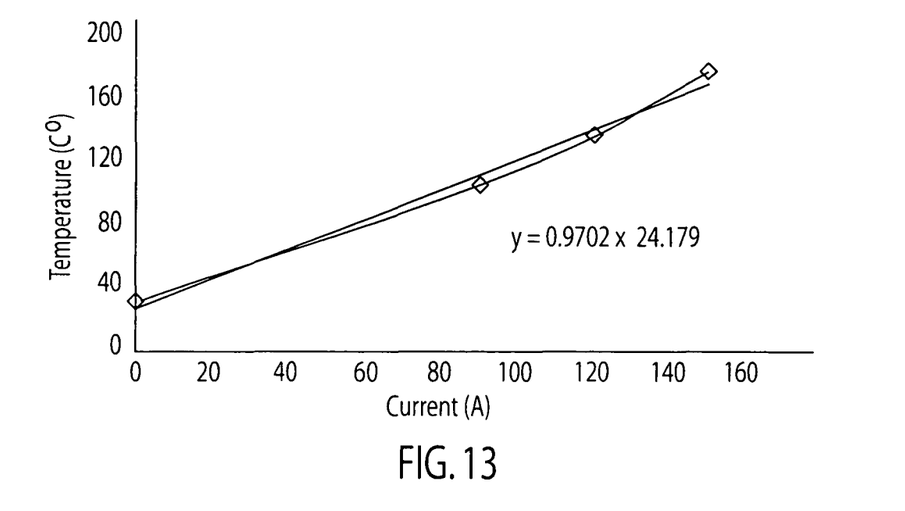
FIG. 13 shows the highest temperature reached during EAST.

Temperature Measurement:

Passing electrical current through the sample increases the temperature. The temperature of the sample during EAST was measured and proved to be too low to lead to such a significant increase of the channel depth. Infrared camera was used to monitor the temperature during EAST. As one example, the temperature contour during the EAST with 120 A electrical current pass through the sheet was observed. At the beginning of texturing, the temperature of the sheet was 27.4° C. which is close to the room temperature. During the texturing, with electrical current pass through the stainless steel sheet, the highest temperature reached up to 136.5° C., FIG. 13, which is still far below the melting temperature of the stainless steel, 1510° C.

The present invention provides micro surface textures having various applications, such as friction/wear reduction, bacteria sterilization, and self-cleaned surfaces. The present invention, a desktop micro surface texturing apparatus, can efficiently and economically fabricate surface textures such as micro channels and micro dimples on the surfaces of thin sheet materials or internal surfaces of a journal bearing. The present invention will have applications in the fields of tribology, for contact surfaces such as journal bearings, and other interfaces such as turbine blades in jet engines, and part and tooling interface in any moving pairs. Thin sheet with micro channels can also be stacked to make arrayed microchannel device (AMD) that facilitates heat exchange or mass transfer. AMD has a direct impact on increasing energy efficiency in the application areas, such as distributed power generation, hydrogen generation and fuel cells Although the invention has been described with respect to certain embodiments, those skilled in the art will appreciate that modifications and changes can be made therein within the scope of the invention as defined by the appended claims.

REFERENCES

[1] Paul, B. K., "Micro Energy and chemical systems and multi-scale fabrication," in Micromanufacturing and Nanotechnology, N. P. Mahalik, Ed., ed: Springer, 2005.

[2] Szeri, A. Z., Tribology: Friction, Lubrication, and Wear: Hemisphere Publishing Co., 1980.

[3] Etsion, I., "State of the art in laser surface texturing," Journal of TribologyTransactions of the Asme, vol. 127, pp. 248-253, January 2005.

[4] Nanbu, T., Ren, N., Yasuda, Y., Zhu, D., and Wang, Q. J., "Micro-textures in concentrated conformal-contact lubrication: Effects of texture bottom shape and surface relative motion," Tribology Letters, vol. 29, pp. 241-252, March 2008.

[5] Pettersson, U. and Jacobson, S., "Influence of surface texture on boundary lubricated sliding contacts," Tribology International, vol. 36, pp. 857-864, November 2003.

[6] Ren, N., Nanbu, T., Yasuda, Y., Zhu, D., and Wang, Q. J., "Micro textures in concentrated-conformal-contact lubrication: Effect of distribution patterns," Tribology Letters, vol. 28, pp. 275-285, December 2007.

[7] Davis, T., Zhou, R., Pallav, K., Beltran, M., Cao, J., Ehmann, K., Wang, Q. J., Xia, Z. C., Talwar, R., and Lederich, R., "Experimental Friction Study of Micro-Scale Laser-Textured Surfaces," in International Workshop on Microfactories, Evanston, Ill., 2008.

[8] Beltran, M., Huang, Y., Zhou, R. and Cao, J., "Microchannel Fabrication using Micro-Incremental Forming in Thin Stainless Steel Sheet," in 3rd International Conference on Micromanufacturing, Pittsburgh, Pa., 2008.

[9] Allen, D. M., "Photochemical machining: from 'manufacturing's best kept secret' to a $6 billion per annum, rapid manufacturing process," Cirp Annals-Manufacturing Technology, vol. 53, pp. 559-572, 2004.

[10] Futamura, M., Dohda, K., Makino, T., and Suzuki, T., "Development of microdimple forming process," in 3rd JSME/ASME, Evanston, Ill., United States, 2008.

[11] Cao, J., Dohda, K., Zhou, R., Makino, T., and Futamura, M., "An Investigation on Bump Formation in Forming of Micro Dimples," Steel Research International, vol. 81, pp. 1160-1165, 2010.

[12] Gao, P., Swei, S. M., "A Six-Degree-of-Freedom Micro-Manipulator Based on Piezoelectric Translators," Nanotechnology, vol. 10, pp. 447-452, 1999.

[13] Yi, B. J., Chung, G., Na, H., Kim, W., Suh, I., "Design and Experiment of a 3DOF Parallel Mi-cro-Mechanism Utilizing Flexure Hinges," IEEE Trans Robotic Autom, vol. 19, pp. 604-612, 2003.

[14] Canfield, S. L., Beard, J. W., Lobontiu, N., O'Malley, E., Samuelson, M., Paine, J., "Development of a Spatial Compliant Manipulator," International Journal of Robotic Automation, vol. 17, pp. 63-71, 2002.

We claim:

1. A method for surface texturing a metallic or non-metallic material, comprising:
    passing a sheet material having a sheet thickness in the range of about 20 µm to about 1.5 mm through a roll gap formed between opposing rolls, at least one of which has one or more micro surface protrusions and/or recesses, wherein the micro surface depressions and/or recesses have a lateral dimension of about 1 µm to about 10 mm and a vertical dimension of about 1 µm to about 10 mm; and
    forming one or more micro surface depressions and/or protrusions in the surface by said micro surface protrusion and/or recess plastically deforming the surface by rolling action.

2. The method of claim 1, wherein the sheet material is an antifriction element.

3. The method of claim 1, wherein the lateral dimension is about 1 pm to about 100 pm and the vertical dimension is about 1 pm to about 100 pm.

* * * * *